United States Patent
Rupp et al.

[19]

[11] Patent Number: 5,839,393
[45] Date of Patent: Nov. 24, 1998

[54] ANIMAL RESTRAINT JACKET

[75] Inventors: Mark E. Rupp; Joseph S. Ulphani, both of Omaha, Nebr.

[73] Assignee: Board of Regents - Univ of Ne Linc, Lincoln, Nebr.

[21] Appl. No.: 822,811

[22] Filed: Mar. 24, 1997

[51] Int. Cl.⁶ ............................................. A01K 15/04
[52] U.S. Cl. ........................................... 119/712; 119/850
[58] Field of Search .................................... 119/712, 815, 119/850, 856, 858

[56] References Cited

U.S. PATENT DOCUMENTS

| | | | |
|---|---|---|---|
| D. 368,338 | 3/1996 | Levengood | 119/850 X |
| 1,595,834 | 8/1926 | Griffiths | 119/850 X |
| 4,489,676 | 12/1984 | Colquist | 119/815 X |
| 5,068,921 | 12/1991 | Jones | 119/850 X |
| 5,293,840 | 3/1994 | Wedlick | 119/850 |
| 5,456,215 | 10/1995 | Deutscher et al. | 119/850 |

*Primary Examiner*—Nicholas D. Lucchesi
*Attorney, Agent, or Firm*—Zarley, McKee, Thomte, Voorhees & Sease; Mark D. Frederiksen

[57] ABSTRACT

An animal restraint jacket includes an elongated sheet formed of a fabric which is stretchable in the longitudinal direction. A pair of leg holes are formed in the sheet proximal to and spaced from the opposing ends of the sheet, such that the jacket is fastened along the chest of the animal. An aperture is formed in the sheet midway between the ends, and a pair of elastic straps are attached at their ends adjacent the aperture, to receive and hold a catheter or other medical device extending through the aperture. A flap is attached along one side edge to the sheet and extends to cover the aperture and elastic straps, and any medical device secured under the straps.

19 Claims, 3 Drawing Sheets

5,839,393

ANIMAL RESTRAINT JACKET

TECHNICAL FIELD

The present invention relates generally to restraint jackets used with laboratory animals, and more particularly to an improved rodent restraint jacket permitting easy access to an implanted intravascular catheter or other bioprostheses.

BACKGROUND OF THE INVENTION

A wide variety of rodent restraint jackets are available in the prior art for use in short term and long term research studies. In the case of animals implanted with vascular catheters or the like, prior art jackets suffer several problems.

One problem associated with prior art rodent restraint jackets is with regard to sterilization. Typically, it is necessary to thread the distal end of a catheter through an aperture in the jacket prior to implantation of the catheter. Since the distal end of the catheter must pass through the jacket, there is a problem in maintaining the sterility of the catheter.

Typically, prior art rodent jackets are fastened together along the back of the animal, with string ties or other fasteners utilized to secure the jacket in place. A tether is then commonly placed over the projecting end of the catheter in order to permit repeated injections or sampling through the catheter. Such tether systems can be quite expensive, calling for swivel connections and other devices for attachment of the hub end of the catheter to the animal's cage. Such tethering systems also require that the distal end of the tether be attached to the jacket adjacent the catheter.

While tether systems permit remote sampling and injections for the rodent, they are less desirable because of the expense of the system, in addition to the stress to the animal and the limited mobility of the animal within the cage.

Prior art animal restraint jackets are also deficient in the fact that they do not adequately cover or protect the distal end of a catheter from contamination or dislodgement by the animal wearing the jacket. For this reason, it was necessary to use restraint collars or tethering systems in addition.

SUMMARY OF THE INVENTION

It is therefore a general object of the present invention to provide an improved animal restraint jacket.

Another object of the present invention is to provide an improved restraint jacket which is capable of attachment to the animal after implantation of the catheter, to eliminate sterilization problems.

Still another object of the present invention is to provide a animal jacket which will permit the hub end of a catheter to be carried directly on the back of the animal, thereby eliminating the need for tether type restraint systems.

A further object is to provide a animal jacket which is economical to manufacture and easy to use.

These and other objects of the present invention will be apparent to those skilled in the art.

The animal restraint jacket of the present invention includes an elongated sheet formed of a fabric which is stretchable in the longitudinal direction. A pair of leg holes are formed in the sheet proximal to and spaced from the opposing ends of the sheet, such that the jacket is fastened along the chest of the animal. An aperture is formed in the sheet midway between the ends, and a pair of elastic straps are attached at their ends adjacent the aperture, to receive and hold a catheter or other medical device extending through the aperture. A flap is attached along one side edge to the sheet and extends to cover the aperture and elastic straps, and any medical device secured under the straps.

DESCRIPTION OF THE PREFERRED EMBODIMENT

Figure 1:
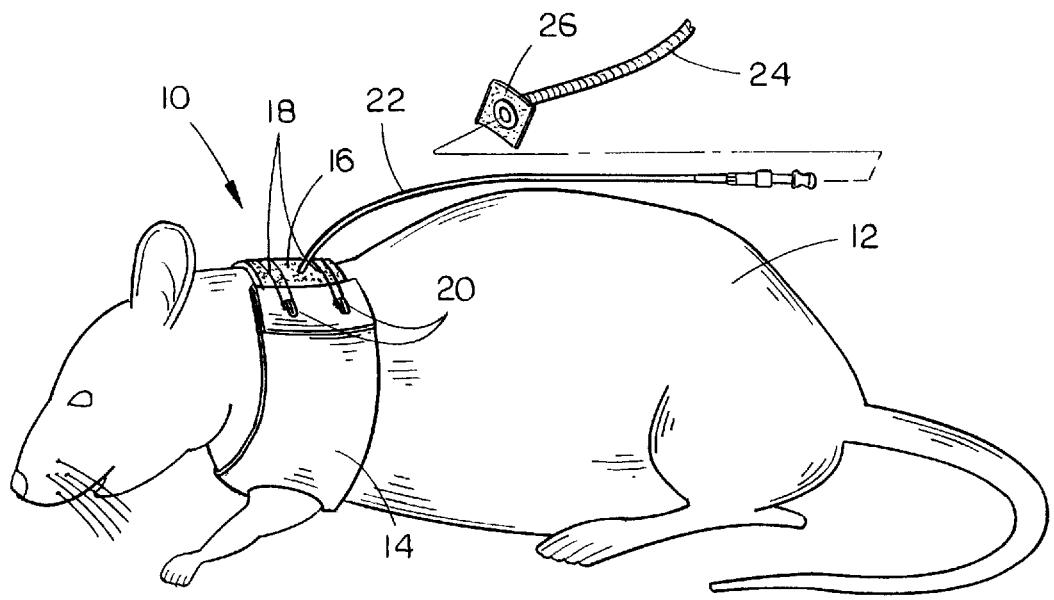
FIG. 1 shows a prior art rodent restraint jacket in place on a rodent.

Referring now to the drawings, in which similar or corresponding parts are identified with the same reference numeral and more particularly to FIG. 1, a prior art restraint jacket is designated generally at 10 and is shown attached to a rat 12. Prior art jacket 10 includes an elongated sheet of fabric 14 with ends connected together by a hook and loop fastener strap 16 on the back of the animal. A pair of ties 18 are secured around hooks 20 on each end of fabric sheet 14, to further secure the jacket into position. A catheter 22 is shown extending through an aperture in the strap 16, and thence into the body of rat 12. A tubular tether 24 is attached to strap 16 with a hook and loop fastener pad 26 mounted at the lower end thereof.

Figure 2:
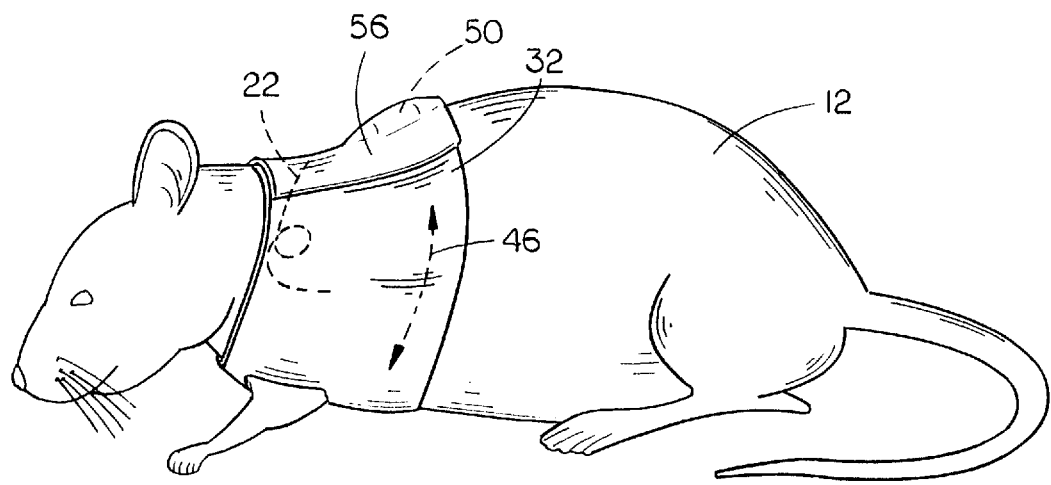
FIG. 2 is a perspective view of the restraint jacket of the present invention attached to a rat.
Figure 3:
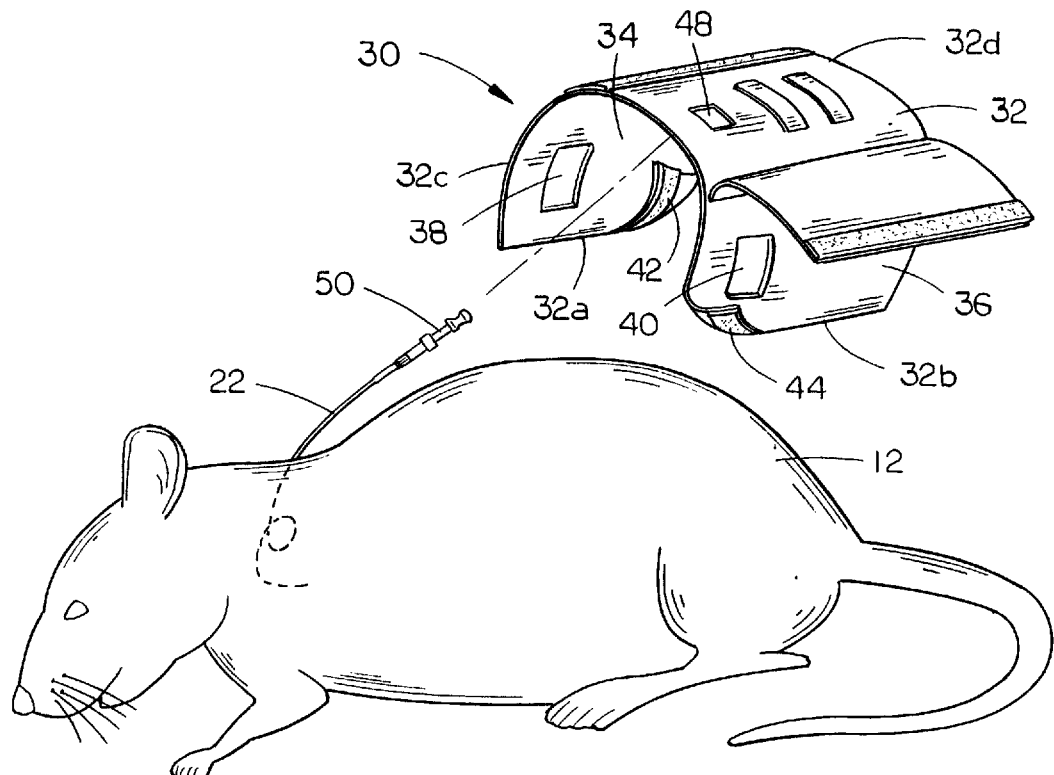
FIG. 3 is a perspective view of the jacket of the present invention removed from the rat to show the various features of the jacket.
Figure 4:
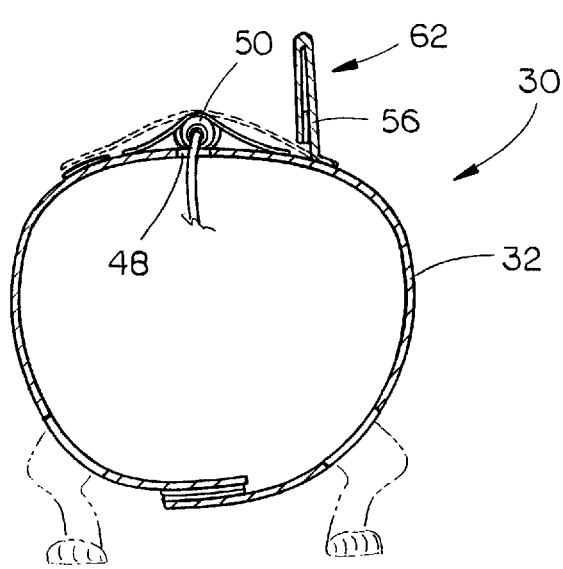
FIG. 4 is a vertical sectional view through the jacket of the present invention, installed on a rodent.
Figure 5:
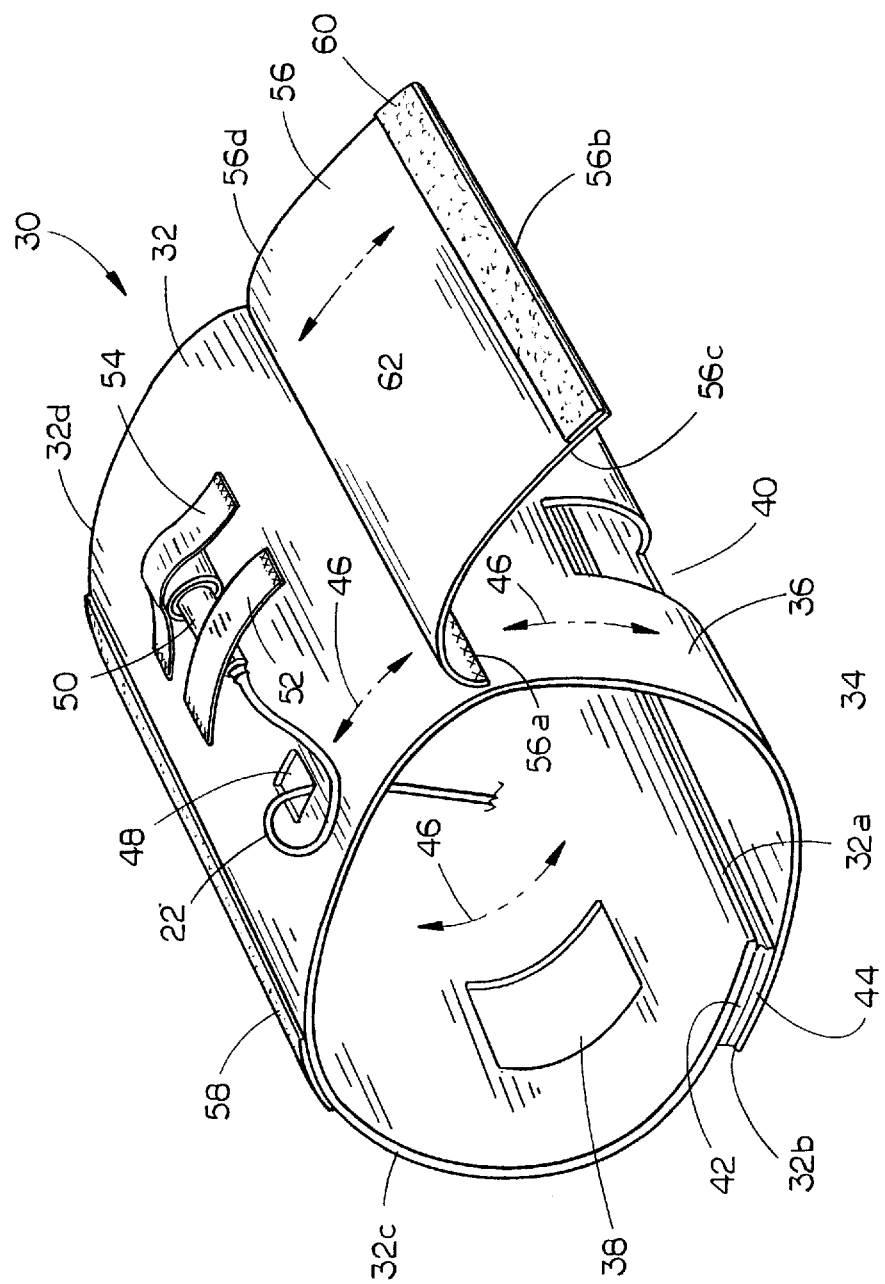
FIG. 5 is a perspective view of the restraint jacket with a catheter restrained thereon.

Referring now to FIGS. 2–5, the improved rodent restraint jacket of the present invention is designated generally at 30 and is formed of an elongated fabric panel 32 having first and second ends 32a and 32b and forward and rearward edges 32c and 32d (as shown more specifically in FIGS. 3 and 5). Jacket 30 includes an inward surface 34, mounted in contact with the body of the rat, and an outward surface 36.

A pair of holes 38 and 40 are formed adjacent but spaced from the forward edge 32c of panel 32, and adjacent each end 32a and 32b, for receiving the legs of the rat therethrough. A strip 42 of hook and loop fastener material is mounted on the outward surface 36 of panel 32 along the length of first end 32a which is cooperable with a second strip 44 of hook and loop fastener material mounted along the panel opposite end 32b on the inward surface 34. Jacket 30 may thereby be formed into a generally cylindrical shape, as shown in FIG. 5, by connecting hook and loop fastener strips 42 and 44 together.

Fabric panel 32 is preferably elastic in a single direction, along its length, from end 32a to end 32b, to permit stretching of the panel 32, as indicated generally by arrows 46 in FIGS. 2 and 5. This elasticity permits the rodent 12 to move about its cage without unduly restricting the animal. In addition, the longitudinal elasticity of fabric panel 32 assists in maintaining the position of leg holes 38 and 40, as well as the entire jacket 30 on the rat, as it moves. Without this elasticity, the jacket would move slightly relative to the skin of the animal, rubbing and chafing on the animal and potentially dislodging the catheter 22 or other device implanted in the animal.

An aperture 48 is formed adjacent the forward edge 32c of panel 32 and located generally centrally between ends 32a and 32b. Aperture 48 is sufficiently large to permit passage of hub 50 on the end of catheter 22, therethrough.

A pair of elastic straps 52 and 54 are sewn at both ends to the outward surface 36 of panel 32 rearwardly of aperture 48, thereby permitting the central portion of each strap 52 and 54 to be stretched upwardly away from panel 32 to secure hub 50 or other medical devices to panel 32. Preferably, straps 52 and 54 are attached parallel and spaced apart from one another and parallel to side edges 32c and 32d of panel 32.

A cover flap 56 formed of fabric which is elastic in a single direction, is attached to the outward surface 36 of panel 32 along a first side edge 56a of flap 56. Side edge 56a is affixed to panel 32 transverse to side edges 32c and 32d, and located intermediate leg hole 40 and elastic straps 52 and 54.

A strip 58 of hook and loop fastener material is mounted to outer surface 36 of panel 32 between leg hole 38 and straps 52 and 54, and oriented parallel to flap side edge 56a. Flap 56 includes a second side edge 56b, forward and rearward edges 56c and 56d, and has a width, as measured between side edges 56a and 56b, great enough to extend over straps 52 and 54 to reach and cover strip 58. A hook and loop fastener strip 60 is mounted on an inward face 62 of flap 56 along side edge 56b, for cooperable connection to strip 58. Preferably, flap 56 is formed of a material which is elastic in the same direction as panel 32, from side edge 56a to side edge 56b. In this way, when flap 56 is positioned over panel 32 and fastened to strip 58, both panel 32 and flap 56 will stretch along with movement of the rodent.

In use, a catheter, or other medical device, is implanted in rat 12, as shown in FIG. 3. Once in position, hub 50 of catheter 22 will be positioned along the back of the rodent 12. Jacket 30 is then attached to the rodent by threading hub 50 through aperture 48 and positioning panel 32 on the back of the animal 12. The panel cited as 32a and 32b are then folded under the rat and the rat's legs are inserted through leg holes 38 and 40. Side edges 32a and 32b are then fastened together using fastener strips 42 and 44, to form the configuration shown in FIG. 5.

Straps 52 and 54 may then be stretched and lifted upwardly away from panel 32, and hub 50 inserted under the straps. The elasticity of straps 52 and 54 will maintain hub 50 in position on panel 32. Finally, flap 56 is folded over hub 50 to connect fastener strip 60 to strip 58 and completely cover the catheter 22 and hub 50, as shown in FIG. 2. With jacket 30 in place, the rat 12 may freely move above its cage without the ability to reach the catheter 22, and thereby preventing any dislodgement or damage to the catheter.

When it is necessary to administer a medication, or take a sample, access to the hub 50 is easily achieved by holding the animal and opening flap 56. The orientation of flap 56 permits the flap to be folded upon itself, as shown in FIG. 4, to thereby form a handle 64 which may be gripped in one hand, while accessing hub 50. Once the procedure has been completed, flap 56 is refastened to strip 58 to cover catheter 22.

If tethering of the animal is required, the same jacket 30 may be easily used for this type of application. The tether may be secured in any conventional fashion to jacket 30, at aperture 48, or in any desired location. Because the jacket may be applied to the animal after implantation of the medical device, there is no problem with sterility of the catheter.

Whereas the invention has been shown and described in connection with the preferred embodiment thereof, many modifications, substitutions and additions may be made which are within the intended broad scope of the appended claims.

We claim:

1. An animal restraint jacket, comprising:
   an elongated sheet having opposing first and second ends, opposing first and second side edges, an inward surface and an outward surface;
   said sheet being formed of a fabric which is elastic in a longitudinal direction, from end to end;
   a first half of a cooperable fastener mounted on the sheet first end;
   a second half of the cooperable fastener mounted on the sheet second end, for selective cooperable connection to the fastener first half;
   a first leg hole formed in the sheet proximal to and spaced from the sheet first end;
   a second leg hole formed in the sheet proximal to and spaced from the sheet second end;
   the first and second holes located proximal to and spaced equidistant from the sheet first side edge; and
   an aperture formed through the sheet generally midway between the first and second ends, and located proximal to and spaced from the sheet first side edge.

2. The animal restraint jacket of claim 1, further comprising a first elongated elastic strap having opposing ends, connected at its ends to said sheet and located generally midway between the sheet first and second ends.

3. The animal restraint jacket of claim 2, wherein said first strap is oriented longitudinally on the sheet, generally parallel to the sheet side edges.

4. The animal restraint jacket of claim 3, further comprising a second elongated elastic strap having opposing ends, connected at its ends to said sheet and located generally midway between the sheet first and second ends.

5. The animal restraint jacket of claim 4, wherein said second strap is oriented parallel to the first strap.

6. The animal restraint jacket of claim 5, wherein said first and second straps are located between the aperture and the sheet second side edge.

7. The animal restraint jacket of claim 6, further comprising a flap attached along a first side edge to said sheet, said flap having dimensions to extend from the attached side edge to cover said aperture and straps.

8. The animal restraint jacket of claim 7, wherein said flap includes a second side edge opposite its first side edge, and further includes means on said flap for selectively fastening the flap to the sheet, covering said aperture and straps.

9. The animal restraint jacket of claim 8, wherein said flap is attached to the sheet with its first side edge oriented transversely to the sheet side edges.

10. The animal restraint jacket of claim 9, wherein said flap is formed of a fabric which is elastic in a direction from one of its side edges to another of its side edges.

11. An animal restraint jacket, comprising:
    an elongated sheet having opposing first and second ends, opposing first and second side edges, an inward surface and an outward surface;
    a first half of a cooperable fastener mounted on the sheet first end;
    a second half of the cooperable fastener mounted on the sheet second end, for selective cooperable connection to the fastener first half;
    a first leg hole formed in the sheet proximal to and spaced from the sheet first end;
    a second leg hole formed in the sheet proximal to and spaced from the sheet second end;
    the first and second holes located proximal to and spaced equidistant from the sheet first side edge; and an aperture formed through the sheet generally midway between the first and second ends, and located proximal to and spaced from the sheet first side edge.

12. The animal restraint jacket of claim 11, further comprising a first elongated elastic strap having opposing ends, connected at its ends to said sheet and located generally midway between the sheet first and second ends.

13. The animal restraint jacket of claim 12, further comprising a second elongated elastic strap having opposing ends, connected at its ends to said sheet and located generally midway between the sheet first and second ends.

14. The animal restraint jacket of claim 13, further comprising a flap attached along a first side edge to said sheet, said flap having dimensions to extend from the attached side edge to cover said aperture and straps.

15. The animal restraint jacket of claim 14, wherein said flap is attached to the sheet with its first side edge oriented transversely to the sheet side edges.

16. An animal restraint jacket, comprising:

an elongated sheet having opposing first and second ends, opposing first and second side edges, an inward surface and an outward surface;

a first half of a cooperable fastener mounted on the sheet first end;

a second half of the cooperable fastener mounted on the sheet second end, for selective cooperable connection to the fastener first half;

a first leg hole formed in the sheet proximal to and spaced from the sheet first end;

a second leg hole formed in the sheet proximal to and spaced from the sheet second end;

the first and second holes located proximal to and spaced equidistant from the sheet first side edge; and a first elongated elastic strap having opposing ends, connected at its ends to said sheet and located generally midway between the sheet first and second ends.

17. The animal restraint jacket of claim 16, further comprising a second elongated elastic strap having opposing ends, connected at its ends to said sheet and located generally midway between the sheet first and second ends.

18. The animal restraint jacket of claim 17, further comprising a flap attached along a first side edge to said sheet, said flap having dimensions to extend from the attached side edge to cover said aperture and straps.

19. The animal restraint jacket of claim 18, wherein said flap is attached to the sheet with its first side edge oriented transversely to the sheet side edges.

* * * * *